Sept. 8, 1964

M. D. PRUSMACK 3,147,556

CALCULATING DEVICE

Filed Sept. 14, 1961

INVENTOR.
Murray D. Prusmack
BY
Townsend and Townsend
attorneys

Sept. 8, 1964    M. D. PRUSMACK    3,147,556
CALCULATING DEVICE
Filed Sept. 14, 1961    2 Sheets-Sheet 2
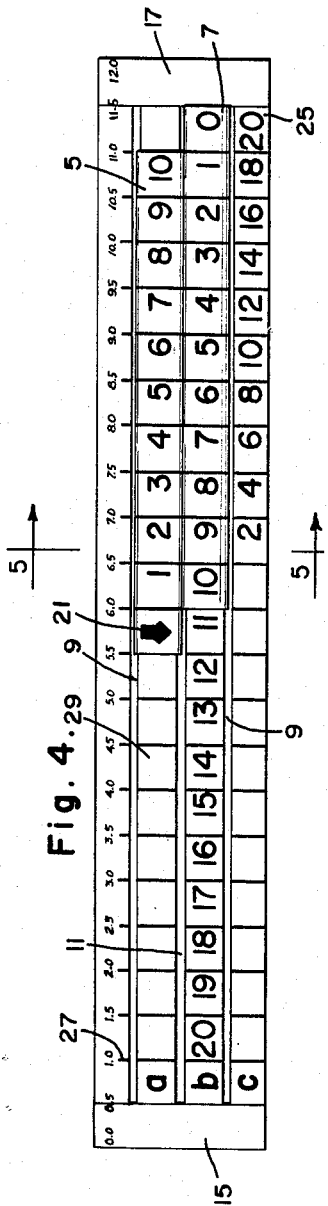
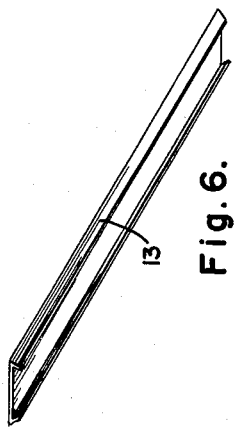
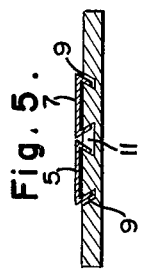
INVENTOR.
Murray L. Prusmack
BY
Townsend and Townsend
attorneys

3,147,556
CALCULATING DEVICE
Murray D. Prusmack, 12775 Viscaino Drive,
Los Altos Hills, Calif.
Filed Sept. 14, 1961, Ser. No. 138,042
2 Claims. (Cl. 35—31)

This invention relates to teaching aids and more particularly to a new and useful calculating device for introducing children of the kindergarten and lower grammar school grades to basic concepts in various branches of mathematics.

It is a primary object of the present invention to provide a device for teaching arithmetic which coordinates the sense of touch with the sense of sight to physically present and demonstrate a variety of basic number groupings in the arts of addition, subtraction, multiplication and division and the number facts of these groupings in a manner which assists the young student in correlating abstract numerical symbols with corresponding physical entities.

To accomplish the above object the invention provides a longitudinal ruler body divided into three parallel stationary rows designated by the letters "$a$," "$b$" and "$c$" respectively. First and second longitudinal runners are medially located on the ruler in parallel alignment and arranged for slideable longitudinal movement relative to the ruler body and to each other. The first runner includes equidistantly spaced graduations having numerals progressively increasing in value, preferably from 1 to 10. On opposite ends of the ruler body are runner engaging stops restricting longitudinal slideable movement of the runners. The "$b$" row of the rule body and the second runner when engaging the right end stop form a series of equidistantly spaced graduations provided with numerals progressively decreasing in value from left to right and preferably from 20 to 0. At the left end of the first runner is a pointer selectively registrable with each numeral on the "$b$" row. The "$b$" row number opposite the pointer comprises the total quantity of all number combinations formed at a given time and the number fact of each individual combination. For example, when demonstrating the art of addition, the row "$b$" number opposite the pointer equals the sum of each registered number group. Conversely, when the art of subtraction is illustrated the pointer indicates the minuend, the subtrahends being formed by the first runner numerals and the remainders comprising the "$b$" row numbers registered with the subtrahends.

Thus, it will be seen that by moving the first and second runners relative to the rule body and to one another all of the possible combinations of the numbers from 1 to 20 can be formed and the student is visually presented with concrete, tangible evidence of these number functions and their relationships.

A further object and advantage of the present invention is to provide a device of the type described and which may be used to familiarize the young student with the basic concepts in the art of multiplication, including the relationship of this art to addition and division. Accordingly, row "$b$" of the rule body includes another stationary portion marked with a series of equidistantly spaced graduations with numerals progressively increasing in value. These numerals are open to view when the second runner engages the left end stop and are registrable and co-extensive with the numerals of the first runner when it contacts the right end stop of the rule body. When arranged in this manner the first runner and row "$b$" form 10 progressive number groupings from 1 to 10. These number groupings may be viewed either as problems in addition or in multiplication. For example, the first registered number grouping comprises two 1 numerals. These may be added to arrive at the sum 2. Likewise, the multiplication fact that two 1's equal 2 is also demonstrated. Completing this function of the device are a series of stationary numerals located on the "$c$" row of the rule body and which correspond either to the sums of each of the above number groupings or their products, as the case may be. In the multiplication calculation the multiplier, 2, is not expressed but is inferred from the two juxtaposed numeral rows "$a$" and "$b$."

A feature and advantage of the present invention resides in the employment of the letter designations "$a$," "$b$" and "$c$." These letter designations may be coordinated with the number groupings of the above-mentioned multiplication feature both to assist the student in learning to equate number symbols with letters and to introduce certain algebraic facts. For example, the young student can be made to readily grasp the fact "$a$" plus "$b$" equals "$c$" upon learning that 1 plus 1 equals 2. The converse of this, i.e. "$a$" minus "$c$" equals "$b$," is also physically apparent.

Still another feature and advantage of the within invention resides in the ability of the device to physically demonstrate basic concepts in the art of fractions. Thus, when both the first and second runners are slideably moved to the left of the rule body, the stationary "$b$" and "$c$" registered numerals may be viewed as a series of fractions, the first of which comprises the basic fraction $\frac{1}{2}$ and is followed by a series of other fractions reducible to $\frac{1}{2}$.

Still another feature of the invention is in the provision of a series of equidistantly spaced graduations on the left end of the "$a$" row of the rule body defining ten linear portions. These linear portions are formed on an erasable surface which can be progressively marked with numerals decreasing in value from 10 to 1 and prefaced by a minus sign. When so numbered, this portion of row "$a$" will coact with the numerals on the second runner providing a series of number groups in subtraction. The pointer will then selectively indicate the remainders of the problems. However, student curiosity is stimulated by leaving these spaces blank and it has been found that the student who masters the rule soon fills in the blanks. Thus, the invention provides a device for individual student evaluation.

Another object of the present invention is to provide a device which seeks to eliminate a common tendency of young students to shrink the concept of our linear foot from 12 to 10 inches. This tendency, which is attributed to constant use of the base 10 or decimal number system, hinders the later study of measurements. This obstacle is largely overcome by the present invention which confines decimal number function to a linear dimension of less than 12 inches but on a ruler body having an over-all length of 12 inches. Additionally, numbered indicia may be provided along the upper edge of the rule body which comprises numbers in decimal and decimal fraction form extending from 0 to 12, thereby demonstrating the relationship of the decimal system to our concept of a foot.

It is a further object of the within invention to acquaint the beginning student of arithmetic with the basic functions and principles of the advanced slide rule.

Still another object of the present invention is to provide a teaching aid for arithmetic of the manipulating type which is rugged and durable and which can be inexpensively fabricated. Thus, the present invention comprises a rule body or housing which may be fabricated from any suitable material such as wood or plastic and includes but two movable parts, i.e. the runners, formed either from plastic or metal sheet. The device may be marked by silk screening or any other suitable process.

Other objects of the present invention will become apparent upon reading the following specification and referring to the accompanying drawings in which similar characters of reference represent corresponding parts in each of the several views.

In the drawings:

FIGS. 1 through 3 are top plan views of a first embodiment of the invention respectively showing the runners illustrating
(a) Calculations in the basic numbers,
(b) Calculation in numbers above the basic numbers, and
(c) Calculation in simple multiplication or addition.

FIG. 4 is a second embodiment of the invention which includes decimal numbers and fractions along the upper edge and is shown illustrating calculations in subtraction.

FIG. 5 is a sectional view taken along line 5—5 of FIG. 4, and

FIG. 6 is a perspective view of a runner or slide detached from the rule body.

Referring now more particularly to the drawings, the calculating device, which is indicated generally at A, comprises a stationary longitudinal rule body 3 and first and second slideable runners 5 and 6.

The rule body, as best seen in FIG. 5, includes two outer longitudinally extending grooves each having side walls which slant downwardly inwardly and a middle groove 11 having side walls with a downwardly outwardly slant. As illustrated in FIGS. 5 and 6, the runners have opposed inwardly slanting side portions 13. Solid members 15 and 17 are located at opposite ends of the rule A and restrict longitudinal slideable movement of the runners. In assembling the device the runners are end loaded on the rule body and end members 15 and 17 attached.

The rule body or housing 3 is divided into three parallel longitudinally extending rows respectively designated by the letters "a," "b" and "c." These rows each include a series of equidistantly spaced lines or graduations 19 which are ½ inch in length and provide a total working or calculating length of 10 inches. The first runner 5 slideably moves over the "a" row stationary portion and is provided with a series of equidistantly spaced graduations marked with numbers progressively increasing in value from 1 to 10. At the left end of this runner is an arrow or pointer 21. Row "b" includes a first stationary portion with equidistantly spaced graduations marked with numbers progressively decreasing in value from 20 to 11. Mounted for slideable movement over row "b" is a second runner or slide 7. This runner includes graduations identical to the stationary portion of row "b" but which are progressively marked from 10 to 0 so as to form a continuous series of numbers from 20 to 0.

When runners 5 and 7 are co-extensively registered, as shown in FIG. 1, all of the number groupings of the number 10 are formed and it will be seen that by selectively moving runner 5 to the left relative to runner 7 along row "a" while runner 7 engages the right end stop member 17, additional number groupings up to 20 are presented. The arrow 21 indicates the amount of number groupings formed by rows "a" and "b" and the number fact of each individual number group. For example, when addition is demonstrated the number opposite pointer 21 is the sum of all numbers in registry. In the case of subtraction, the pointer indicated number is the minuend.

In FIG. 3 the second runner 7 is shown located to the left of the rule housing 3. Exposed to view on row "b" is another series of equidistantly spaced stationary graduations 23 marked with numbers progressively increasing in value from 1 to 10. This series 23 is in registry with the numerals of runner 5 when it engages stop member 17 whereby a dual series of aligned numbers from 1 to 10 is formed. In registry with this dual series and on row "c" therebetween is a series of numbers 25 which commences with the number 2, progressively increases by 2 and ends with the number 20. These row "c" numbers comprise either the sums of the row "a" and "b" numbers grouped thereabove or their products depending on how these groupings are characterized.

Additionally, the above mentioned groupings demonstrate the interrelationships of subtraction and division to addition and multiplication, the former respectively being reverse processes of the latter.

With further reference to FIG. 3, the number series 23 and 25, viewed together and without reference to runner 5 (preferably moved to the left and out of registry), there is presented a group of common fractions graduated from ½ to $^{10}\!/_{20}$ and wherein groove 9 forms the division sign. These groupings are for illustrating the functions of fractions including simple division, decimal fractions and the factoring process.

The graduations of the row "a" stationary portion 29, shown in FIG. 3, are left unnumbered for erasable student insertion of subtrahends progressively decreasing in value from 10 to 1. When the graduations are so numbered, runner 7, illustrated in stop engagement with stop member 15, may be selectively moved to the right causing pointer 21 to selectively calculate the remainders of the problems presented.

FIG. 4 of the drawings comprises a second embodiment of the invention which includes all of the elements of the embodiment of FIGS. 1–3 but which differs therefrom in the provision of a plurality of equidistantly spaced numbered graduations 27 from 0 to 12. These graduations are spaced apart ½ inch from each other and the corresponding numerals are expressed in decimal and decimal fraction form. Since the linear dimension of the "a," "b" and "c" rows on which calculations in the base 10 system are performed is less than 12 inches, the student is visually presented with a line of distinction between our linear foot and the number 10. This distinction is enhanced by employment of the decimals and decimal fractions on the upper edge of the ruler 3 which serve to co-relate the decimal system with the measurement system based on units of 12.

The runners 5 and 7 of FIG. 4 are positioned to demonstrate calculations in subtraction. Pointer 21 of runner 5 faces row "b" number 11, the minuend. The runner 5 numbers are the subtrahends and the runner 7 numbers in registry therewith are the remainders. The subtraction sign is carried mentally by the student.

From the foregoing it will be seen that the within invention provides a device which, by simple manipulation, co-relates numerical symbols and number functions with their corresponding physical entities and functions to visually demonstrate in a realistic and concrete manner various number facts in basic mathematics.

Although the foregoing invention has been described in some detail by way of illustration and example for purposes of clarity of understanding, it is understood that certain changes and modifications may be practiced within the spirit of the invention and scope of the appended claims.

What is claimed is:

1. In a calculating device for teaching basic mathematics, the combination comprising: a manipulating device including a stationary longitudinal rule body, first and second equal length longitudinal members mounted on said body medial thereof and for independent slideable and parallel movement therealong; stops on opposite ends of said body for limiting movement of said first and second longitudinal members to a distance approximately equal to one-half the length of said body; attachment means on said body receiving said members; a series of equidistantly spaced graduations on said first member defining face portions therebetween, the first of which is marked with a pointer and is followed by a series of numbers progressively increasing in value from 1 to 10; a series of equidistantly spaced graduations on said second member defining face portions therebetween marked with numbers progressively decreasing in value from 10 to 0 and registrable with the graduations, pointer and numbers of said first member, said second member selectively movable relative to said first member to visually present a plurality of basic number groupings and to calculate the number facts of each said grouping, and a stationary portion contiguous with said second member having equidistantly spaced graduations defining spaced portions therebetween, said spaced portions being marked with numbers progressively decreasing from 20 to 11 to form a continuous series of numbers from 20 to zero registrable with said first member when said second member is in right end stop engagement.

2. In a calculating device according to claim 1 wherein said rule body is provided with first and second stationary co-extensive scales disposed in parallel relationship and registered with said first member when said first and second members are respectively in right and left end stop engagement; said first scale having equidistantly spaced graduations defining face portions therebetween marked with numbers progressively increasing in value from 1 to 10 and forming a plurality of number groupings with said first member; said second scale having equidistantly spaced graduations defining face portions therebetween marked with numbers selectively forming the respective sums of the number groupings thereabove.

References Cited in the file of this patent

UNITED STATES PATENTS

| | | |
|---|---|---|
| 1,165,058 | Behan | Dec. 21, 1915 |
| 2,422,421 | Kaufman | June 17, 1947 |
| 2,614,751 | Heinz | Oct. 21, 1952 |